(12) United States Patent
Hibbard et al.

(10) Patent No.: US 8,207,885 B2
(45) Date of Patent: Jun. 26, 2012

(54) ADJUSTABLE PULSE WIDTH GROUND PENETRATING RADAR

(75) Inventors: Mark Hibbard, Arlington, VA (US); Howard Bandell, Leesburg, VA (US)

(73) Assignee: Niitek, Inc., Dulles, VA (US)

( * ) Notice: Subject to any disclaimer, the term of this patent is extended or adjusted under 35 U.S.C. 154(b) by 1033 days.

(21) Appl. No.: 11/857,840

(22) Filed: Sep. 19, 2007

(65) Prior Publication Data

US 2010/0066585 A1  Mar. 18, 2010

(51) Int. Cl.
 *G01S 13/88* (2006.01)
(52) U.S. Cl. ............... 342/22; 342/27; 342/82; 342/137
(58) Field of Classification Search .................... 342/22, 342/27, 82, 137
See application file for complete search history.

(56) References Cited

U.S. PATENT DOCUMENTS

| | | | |
|---|---|---|---|
| 3,639,784 A * | 2/1972 | Kelleher, Jr. ................ | 327/294 |
| 4,070,673 A | 1/1978 | Schmidt et al. | |
| 4,438,404 A | 3/1984 | Philipp | |
| 4,439,765 A | 3/1984 | Wilmot | |
| 4,581,715 A | 4/1986 | Hyatt | |
| 4,590,614 A | 5/1986 | Erat | |
| 4,591,858 A | 5/1986 | Jacobson | |
| 4,678,345 A | 7/1987 | Agoston | |
| 4,686,655 A | 8/1987 | Hyatt | |
| 4,715,000 A | 12/1987 | Premerlani | |
| 4,760,525 A | 7/1988 | Webb | |
| 4,833,475 A | 5/1989 | Pease et al. | |
| 5,003,562 A | 3/1991 | van Driest et al. | |
| 5,053,983 A | 10/1991 | Hyatt | |
| 5,115,245 A | 5/1992 | Wen et al. | |
| 5,192,886 A | 3/1993 | Wetlaufer | |
| 5,315,627 A | 5/1994 | Draving | |
| 5,351,055 A | 9/1994 | Fujikawa et al. | |
| 5,386,215 A | 1/1995 | Brown | |
| 5,396,658 A | 3/1995 | Hwu et al. | |
| 5,420,531 A | 5/1995 | Wetlaufer | |
| 5,420,589 A | 5/1995 | Wells et al. | |
| 5,451,894 A | 9/1995 | Guo | |
| 5,469,176 A * | 11/1995 | Sandler et al. ................ | 342/375 |
| 5,495,260 A | 2/1996 | Couture | |
| 5,523,760 A | 6/1996 | McEwan | |
| 5,552,793 A | 9/1996 | McLeod et al. | |
| 5,748,153 A | 5/1998 | McKinzie, III et al. | |
| 5,900,761 A | 5/1999 | Hideno et al. | |

(Continued)

FOREIGN PATENT DOCUMENTS

CA  2266222  9/1999

(Continued)

OTHER PUBLICATIONS

Kim et al., Design and Realization of a Discretely Loaded Resistive Vee Dipole on a Printed Circuit Board, 2003, pp. 818-829, vol. 5089, Proceedings of SPIE.

(Continued)

*Primary Examiner* — John B Sotomayor
(74) *Attorney, Agent, or Firm* — Finnegan Henderson Farabow Garrett & Dunner LLP

(57) ABSTRACT

A ground penetrating radar system is described that is able to create both low frequency, wide pulses, and high frequency, narrow pulses, to enable both deep and shallow operation of the ground penetrating radar on demand, including simultaneous operation.

29 Claims, 7 Drawing Sheets

U.S. PATENT DOCUMENTS

| | | | |
|---|---|---|---|
| 5,900,833 A * | 5/1999 | Sunlin et al. ............... 342/22 | |
| 5,939,912 A | 8/1999 | Rehm | |
| 5,969,667 A | 10/1999 | Farmer et al. | |
| 5,986,600 A | 11/1999 | McEwan | |
| 6,002,723 A | 12/1999 | Chethik | |
| 6,055,287 A | 4/2000 | McEwan | |
| 6,150,863 A | 11/2000 | Conn et al. | |
| 6,211,814 B1 | 4/2001 | Benjamin et al. | |
| 6,239,764 B1 | 5/2001 | Timofeev et al. | |
| 6,249,242 B1 | 6/2001 | Sekine et al. | |
| 6,281,833 B1 | 8/2001 | Pringle et al. | |
| 6,329,929 B1 | 12/2001 | Weijand et al. | |
| 6,342,866 B1 | 1/2002 | Ho et al. | |
| 6,345,099 B1 | 2/2002 | Alvarez | |
| 6,433,720 B1 | 8/2002 | Libove et al. | |
| 6,501,413 B2 | 12/2002 | Annan et al. | |
| 6,538,614 B2 | 3/2003 | Fleming et al. | |
| 6,580,304 B1 | 6/2003 | Rieven | |
| 6,650,661 B1 | 11/2003 | Buchanan et al. | |
| 6,657,577 B1 | 12/2003 | Gregersen et al. | |
| 6,680,634 B1 | 1/2004 | Ruha et al. | |
| 6,690,741 B1 | 2/2004 | Larrick, Jr. et al. | |
| 6,694,273 B2 | 2/2004 | Kurooka et al. | |
| 6,778,000 B2 | 8/2004 | Lee et al. | |
| 6,798,258 B2 | 9/2004 | Rieven | |
| 6,836,239 B2 | 12/2004 | Scott | |
| 6,845,458 B2 | 1/2005 | Lin | |
| 6,845,459 B2 | 1/2005 | Lin | |
| 6,853,338 B2 | 2/2005 | McConnell | |
| 6,864,833 B2 | 3/2005 | Lyon | |
| 6,868,504 B1 | 3/2005 | Lin | |
| 6,885,343 B2 | 4/2005 | Roper | |
| 6,912,666 B2 | 6/2005 | Lin | |
| 6,914,468 B2 | 7/2005 | Van Dijk et al. | |
| 6,930,528 B2 | 8/2005 | Ajit | |
| 6,956,422 B2 | 10/2005 | Reilly et al. | |
| 7,020,794 B2 | 3/2006 | Lin | |
| 7,026,850 B2 | 4/2006 | Atyunin et al. | |
| 7,042,385 B1 | 5/2006 | Wichmann | |
| 7,053,814 B2 | 5/2006 | Yap | |
| 7,157,952 B2 | 1/2007 | Avants et al. | |
| 7,161,531 B1 | 1/2007 | Beazell | |
| 7,788,793 B2 | 9/2010 | Wichmann | |
| 7,982,656 B2 * | 7/2011 | Coward et al. ............ 342/22 | |
| 2002/0000946 A1 | 1/2002 | Portin | |
| 2003/0043078 A1 | 3/2003 | Deng et al. | |
| 2003/0179025 A1 | 9/2003 | Partsch et al. | |
| 2004/0036655 A1 | 2/2004 | Sainati et al. | |
| 2004/0090373 A1 | 5/2004 | Faraone et al. | |
| 2004/0111650 A1 | 6/2004 | Chen | |
| 2004/0178838 A1 * | 9/2004 | Ngo et al. ............... 327/276 | |
| 2005/0200549 A1 | 9/2005 | Thompson et al. | |
| 2005/0237260 A1 | 10/2005 | Bancroft | |
| 2005/0286320 A1 | 12/2005 | Iwasaki | |
| 2006/0038598 A1 | 2/2006 | Reilly et al. | |
| 2006/0038599 A1 | 2/2006 | Avants et al. | |
| 2006/0119407 A1 | 6/2006 | Abrosimov | |
| 2006/0132210 A1 | 6/2006 | Kong et al. | |
| 2006/0256025 A1 | 11/2006 | Askildsen | |
| 2007/0080864 A1 | 4/2007 | Channabasappa | |
| 2008/0001808 A1 | 1/2008 | Passarelli et al. | |
| 2008/0291080 A1 | 11/2008 | Wilens et al. | |
| 2010/0066585 A1 * | 3/2010 | Hibbard et al. ............ 342/22 | |
| 2010/0237871 A1 * | 9/2010 | Allouche et al. .......... 324/337 | |

FOREIGN PATENT DOCUMENTS

EP               615137 A2     9/1994

OTHER PUBLICATIONS

Whiteley, et al., 50 GHz Sampler Hybrid Utilizing a Small Shockline and an Internal SRD, 1991, pp. 895-898, IEEE Microwave Theory & Technique-S Digest.

Tek Sampling Oscilloscopes Technique Primer 47W-7209, October 2989, pp. 1-4, Tektronix, Inc.

Office Action issued in related U.S. Appl. No. 11/260,038 mailed Oct. 17, 2007.

Office Action issued in related U.S. Appl. No. 11/260,038 mailed Mar. 17, 2007.

Office Action issued in related U.S. Appl. No. 11/260,038 mailed Aug. 6, 2008.

Wikipedia, the free encyclopedia, "Field-Programmable Gate Array,"Internet Brief, "http://en.wikipedia.org/wiki/FPGA," search date Sep. 27, 2006, 7 pgs.

Office Action issued in related U.S. Appl. No. 11/754,136 mailed May 12, 2008.

International Search Report issued in International Application No. PCT/US2008/72303, mailed Oct. 22, 2008.

Written Opinion issued in International Application No. PCT/US2008/72303, mailed Oct. 22, 2008.

Daniels, Jeffrey J. et al., "Ground Penetrating Radar for Imaging Archeological Objects," Proceedings of the New Millennium International Forum on Conservation of Cultural Property, Dec. 5-8, 2000, pp. 247-265, edited by Suckwon Choi and Mancheol Suh, Institute of Conservation Science for Cultural Heritage, Kongju National University, Kongju, Korea.

Kinlaw, Alton E., et al., "Use of Ground Penetrating Radar to Image Burrows of the Gopher Tortoise (*Gopherus polyphemus*)" Herpetological Review, 2007, pp. 50-56, vol. 38, No. 1, Society for the Study of Amphibians and Reptiles.

"Energy Focusing Ground Penetrating radar (EFGPR) Overview," Jan. 28, 2003, pp. 1-12, Geo-Centers, Inc.

Montoya, et al., "Land Mine Detection Using a Ground-Penetrating Radar Based on Resistively Loaded Vee Dipoles," Dec. 1999, pp. 1795-1806, vol. 47, No. 12, IEEE Transactions on Antennas and Propagation.

Kim et al., "A Resistive Linear Antenna for Ground-Penetrating Radars", 2004, pp. 359-370, vol. 5415, proceedings of SPIE.

Kim et al., "Design of a Resistively Loaded Vee Dipole for Ultrawide-Band Ground-Penetrating Radar Applications", Aug. 2005, pp. 2525-2532, vol. 53, No. 8, IEE Transactions on Antennas and Propagation.

Kim et al., "Design and Realization of a Discretely Loaded Resistive Vee Dipole for Ground-Penetrating Radars", Jul. 2004, pp. 1-9, vol. 39, Radio Science.

Montoya, Thomas P., "Vee Dipole Antennas for use in Short-Pulse Ground-Penetrating Radars", Mar. 1998, Georgia Institute of Technology.

International Search Report issued in PCT/US08/064552 on Jul. 7, 2009.

Written Opinion issued in PCT/US08/064552 on Jul. 7, 2009.

Press et a., "Numerical Recipes in C: The Art of Scientific Computing—2nd", Cambridge University Press, Jan. 1, 1992.

Final Office Action issued in U.S. Appl. No. 11/260,038 dated Feb. 5, 2009.

International Search Report issued in Application No. PCT/US2008/064541 mailed Nov. 4, 2008.

Written Opinion issued in Application No. PCT/US2008/064541 mialed Nov. 4, 2008.

International Search Report issued in Application No. PCT/US2008/072543 mailed Nov. 4, 2008.

Written Opinion issued in Application No. PCT/US2008/072543 mailed Nov. 4, 2008.

International Preliminary Report on Patentability issued in Application No. PCT/US2008/064541 on Dec. 1, 2009.

International Preliminary Report on Patentability issued in Application No. PCT/2008-064552 on Dec. 1, 2009.

International Preliminary Report on Patentability issued in PCT/US2008/072303 on Mar. 18, 2010.

Written Opinion issued in PCT/US2008/072303 on Mar. 18, 2010.

International Preliminary Report on Patentability issued in PCT/US2008/072543 on Apr. 1, 2010.

Written Opinion issued in PCT/US2008/072543 on Apr. 1, 2010.

Examination report issued in AU 2008256841 on Feb. 7, 2011.

File History of U.S. Appl. No. 11/734,136.

File History of U.S. Appl. No. 11/852,030.

Office Action issued in U.S. Appl. No. 11/754,136 mailed Jan. 5, 2009.

Office Action issued in U.S. Appl. No. 11/292,433 mailed Nov. 24, 2008.

File History of U.S. Appl. No. 11/292,433.

File History of U.S. Appl. No. 11/754,127.
File History of U.S. Appl. No. 11/754,152.
File History of U.S. Appl. No. 11/260,038.
Specification, claims, and drawings of U.S. Appl. No. 60/969,286, filed Aug. 31, 2007 (23 pages total).
Han, J. et al. "Ultra-Wideband Electronically Tunable Pulse Generators," IEEE Microwave and Wireless Components Letters, vol. 14, No. 3, Mar. 2004 (3 pages total).

Li, K. "UWB Bandpass Filter: Structure, Performance and Application to UWB Pulse Generation," APMC2005 Proceedings (4 pages total).
Li, X. et al. "Numerical and Experimental Investigation of an Ultrawideband Ridged Pyramidal Horn Antenna With Curved Launching Plane for Pulse radiation," IEEE Antennas and Wireless Propagation Letters, vol. 2, 2003 (4 pages total).

* cited by examiner

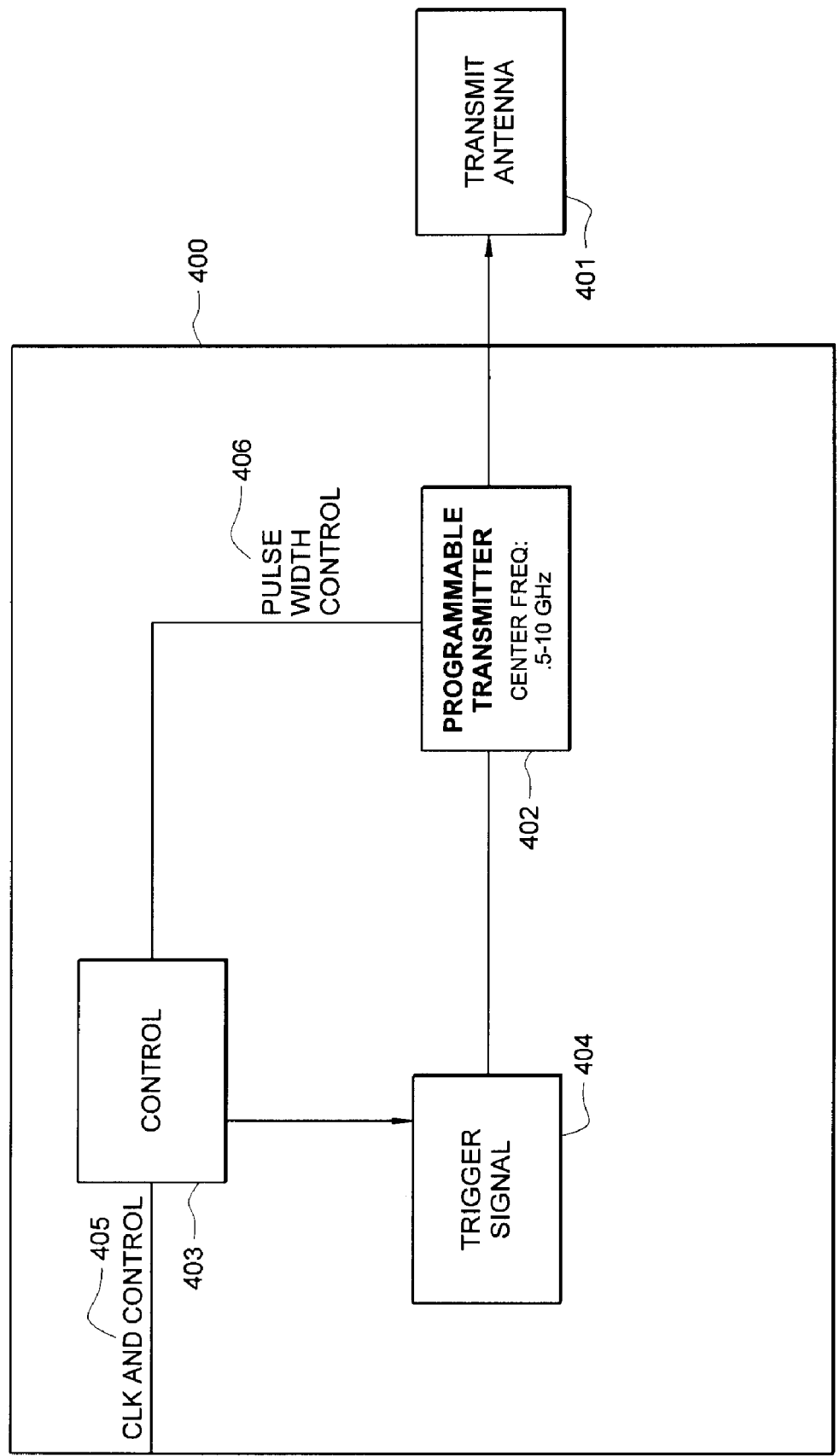

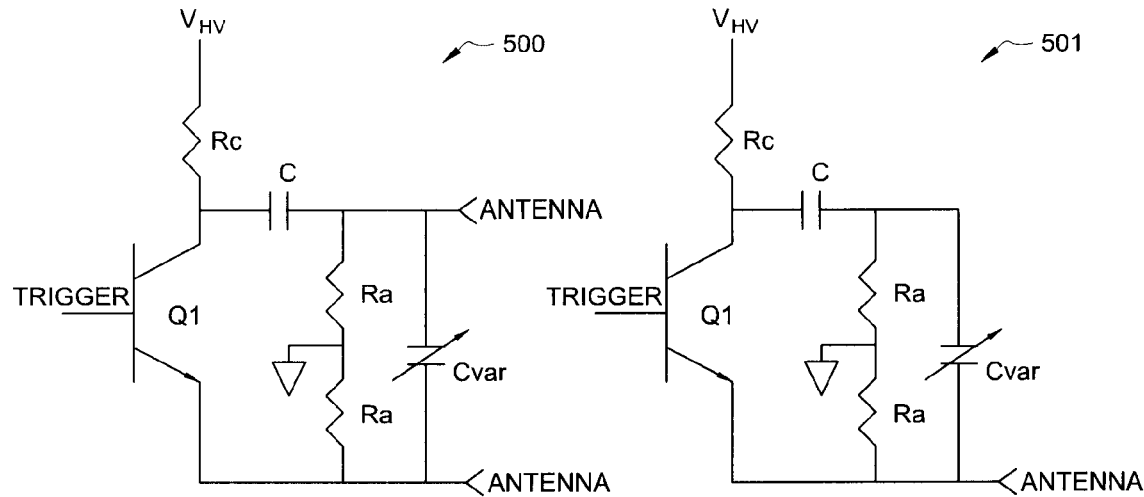
FIG. 5A
FIG. 5B
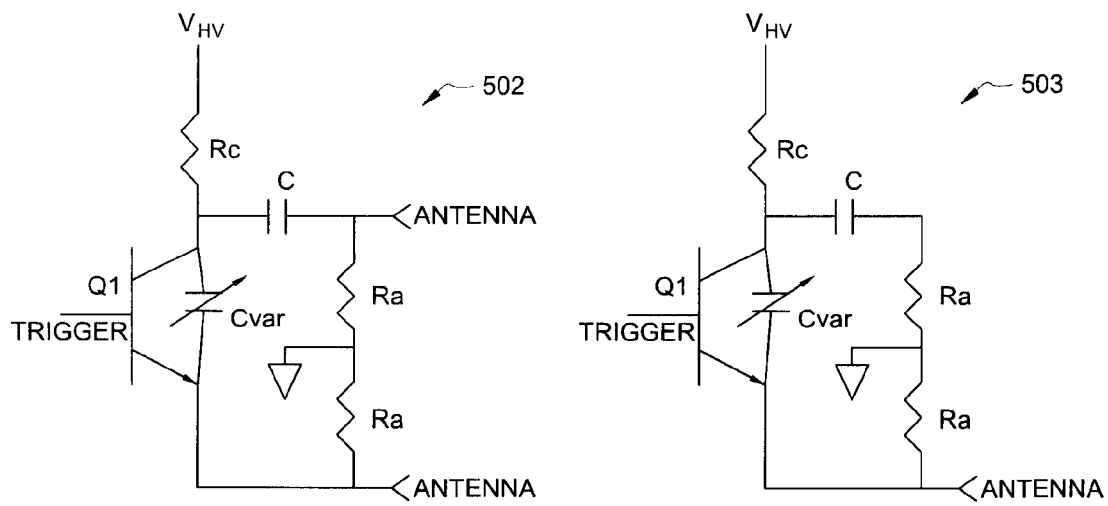
FIG. 5C
FIG. 5D

ADJUSTABLE PULSE WIDTH GROUND PENETRATING RADAR

TECHNICAL FIELD

This invention relates to ground penetrating radar systems and particularly to a system that can generate variable pulse width radar pulses to image both shallow objects and deep objects.

BACKGROUND OF THE INVENTION

Ground penetrating radar systems have been used for some time to image objects buried beneath the ground. As with all radar systems high frequency, or short pulse width radars are very good at providing detailed resolution of objects being imaged. However conductive attenuation and dissipative losses due to soil conditions and moisture increase dramatically with frequency, limiting the ability of to penetrate deeply into the soil.

Lower frequency radar systems, or those with wide pulse widths are able to penetrate much more deeply into the ground as they are much less affected by the dissipative characteristics of the soil and sand. Lower frequency radar yield less resolution than high frequency radar, thereby limiting its ability to define images objects. Generally, however, objects of interest at greater depths are larger or multiple limiting the need for high resolution.

As a result of these characteristics, ground based radar systems are chosen based on the types of imaging required. High frequency radar systems are chosen to provide great detail of shallow objects. An application of a high frequency radar system in a military context would be to locate land mines or improvised explosive devices which are buried only a few inches from the surface. Low frequency radar systems are chosen to find deeper objects such as bunkers, weapons caches and other larger objects buried at greater depths, but which are also larger object that do not require the resolution of the high frequency radar systems.

There are times, however when it is desirable to image both shallow objects at high resolution and deep objects. Current systems require the use of two separate radar systems and all their associated antennas and electronics. It would be advantageous in these instances to have a single ground penetrating radar system that is capable of generating a variety of pulse widths including both low frequency, wide pulses and high frequency, short pulses to enable both deep and shallow operation on demand, as well as potentially an intermediate frequency that provides greater resolution than the low frequency pulses at depths greater then the high frequency pulses.

BRIEF SUMMARY OF THE INVENTION

In accordance with the concepts described herein a ground penetrating radar capable of generating multiple frequency pulses is described. In one embodiment a ground penetrating radar system includes an antenna and a variable width pulse generator connected to the antenna. The variable width pulse generator operable to generating pulses at differing frequencies. The system further includes control circuitry connected to the at least to pulse generators, such that the control circuitry controls the pulse width of the variable width pulse generator.

In another embodiment, a ground penetrating radar system is described that includes an antenna and at least two pulse generators connected to the antenna where at least two pulse generators generating pulses at differing frequencies. The system also includes control circuitry connected to the at least to pulse generators, the control circuitry for controlling which of the at least two pulse generators is transmitting to the antenna during a particular frame.

In yet another embodiment, a ground penetrating radar system includes an antenna connected to a variable width pulse generator. The variable width pulse generator is operable to generate pulses at differing frequencies. The variable width pulse generator is formed by an avalanche transistor and a variable capacitor such that the pulse width of the variable width pulse generator is determined by the value of the variable capacitor. Control circuitry connected to the at variable pulse generator controls the pulse width of the pulse generator by controlling the value of the variable capacitor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 4 is a block diagram of an embodiment of a variable-frequency ground penetrating radar unit according to the concepts described herein;

FIGS. 5(a) through (d) are circuit diagrams of embodiments of variable width pulse generators according to the concepts described herein;

DETAILED DESCRIPTION OF THE INVENTION

Figure 1:
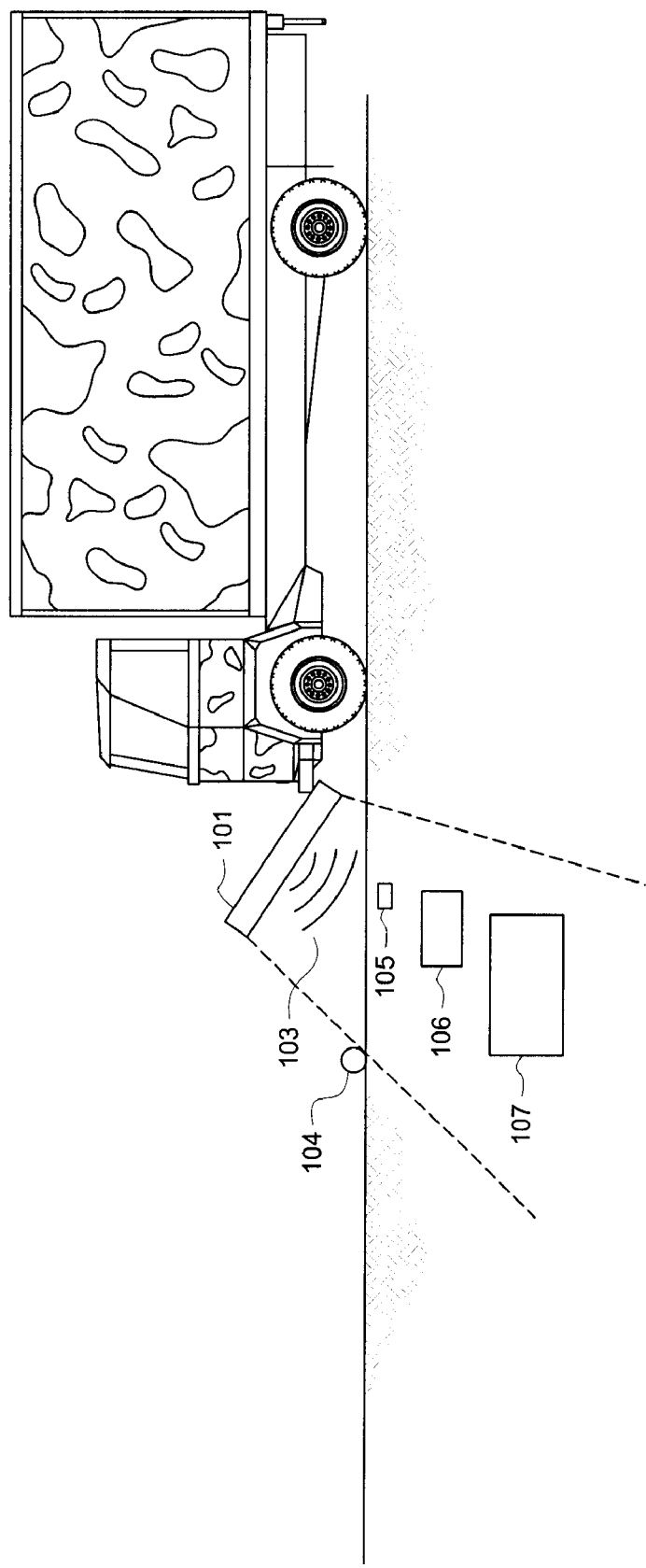
FIG. 1 is an illustration of an embodiment of a ground penetrating radar unit according to the concepts described herein mounted to a vehicle.

FIG. 1 is an illustration of a ground penetrating radar (GPR) unit 101 mounted to a vehicle 102. GPR unit 101 transmits radar pulses 103 which penetrate the ground in a survey area 104. Object 105, 106 and 107 reflect radar pulses 103, and these reflections are captured by GPR unit 101 and processed for display to an operator.

As discussed radar pulses 103 are absorbed, or dissipated, in the ground based on their frequency. Higher frequency pulses are dissipated quickly and therefore are unable to penetrate deeply into the survey area 104. Those higher frequency pulses may not penetrate to the depth of objects such as object 106 or 107. The high frequency pulses would, however provide high resolution as would be required to identify a small shallow object, such as object 105. Lower frequency pulses can penetrate to deeper into survey area 104 to image objects such as object 106 or 107, however, the resolution would not be as detailed as is possible with higher frequency pulses.

Figure 2:
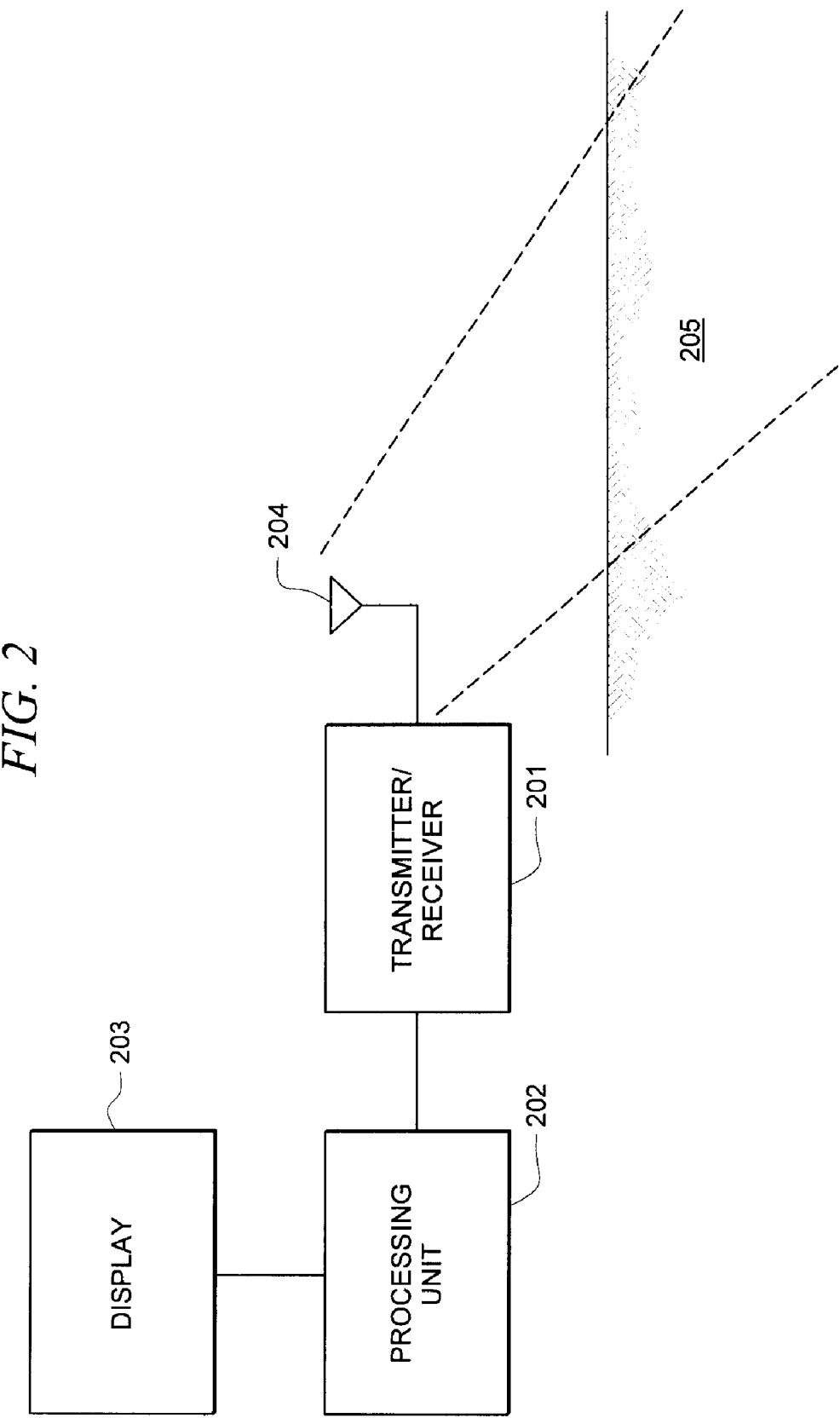
FIG. 2 is a block diagram of an embodiment of a ground penetrating radar system in accordance with the concepts described herein.

FIG. 2 is an illustration of an embodiment of an ground penetrating radar system 200 adapted according to the concepts described herein. System 200 includes transmitter/receiver (Tx/Rx) unit 201, processing unit 202, and display unit 203 and is operable to produce a radar display image based on the return echo of the transmitted radar pulses transmitted and received using antenna 204.

Tx/Rx unit 201 includes a plurality of elements that radiate radar signals and receive returned signals. In some embodiments, transmitter and receiver elements may be separate or may be integrated, e.g., transceiver elements. In this example, system 200 is a Ground Penetrating Radar (GPR) system, and its radiation is focused on ground survey area 205. The radiation penetrates the ground and provides data with regard to a survey volume.

In this example, the transmitter/receiver elements are arranged in one or more linear arrays parallel to the ground, with each of the elements corresponding to a portion of the width of survey area 205. Further, in GPR systems, the time between a transmit pulse and a receive pulse gives the depth of the radar sample. Each of the transmit/receive elements captures a series of pulses over a time period in order to provide the depth of the survey volume.

Each of the captured pulses may be referred to as a "sample." A series of pulses captured by the same transmit/receive element over a depth range may be referred to as a "channel." The collection of channels for each of the transmit/receive elements may be referred to as a "scan." As described above with reference to FIG. 1, system 200 can be placed on a moveable platform, such as on a vehicle, so that additional scans can be taken to traverse the length dimension of survey volume 205. Additionally or alternatively, unit 201 may be tilted up or down with respect to the ground in order to cover the length dimension of survey volume 205.

Processing unit 202 receives the returned signals from Tx/Rx unit 201 and performs various algorithms on the data in order to derive useful information, as well as to create image data to be displayed on display 203. Processing unit 202 decreases the number of samples in the returned signals so that the information therein can be processed with speed, while at the same time retaining enough data to provide an adequate degree of resolution so that smaller items of interest can be identified.

Figure 3:
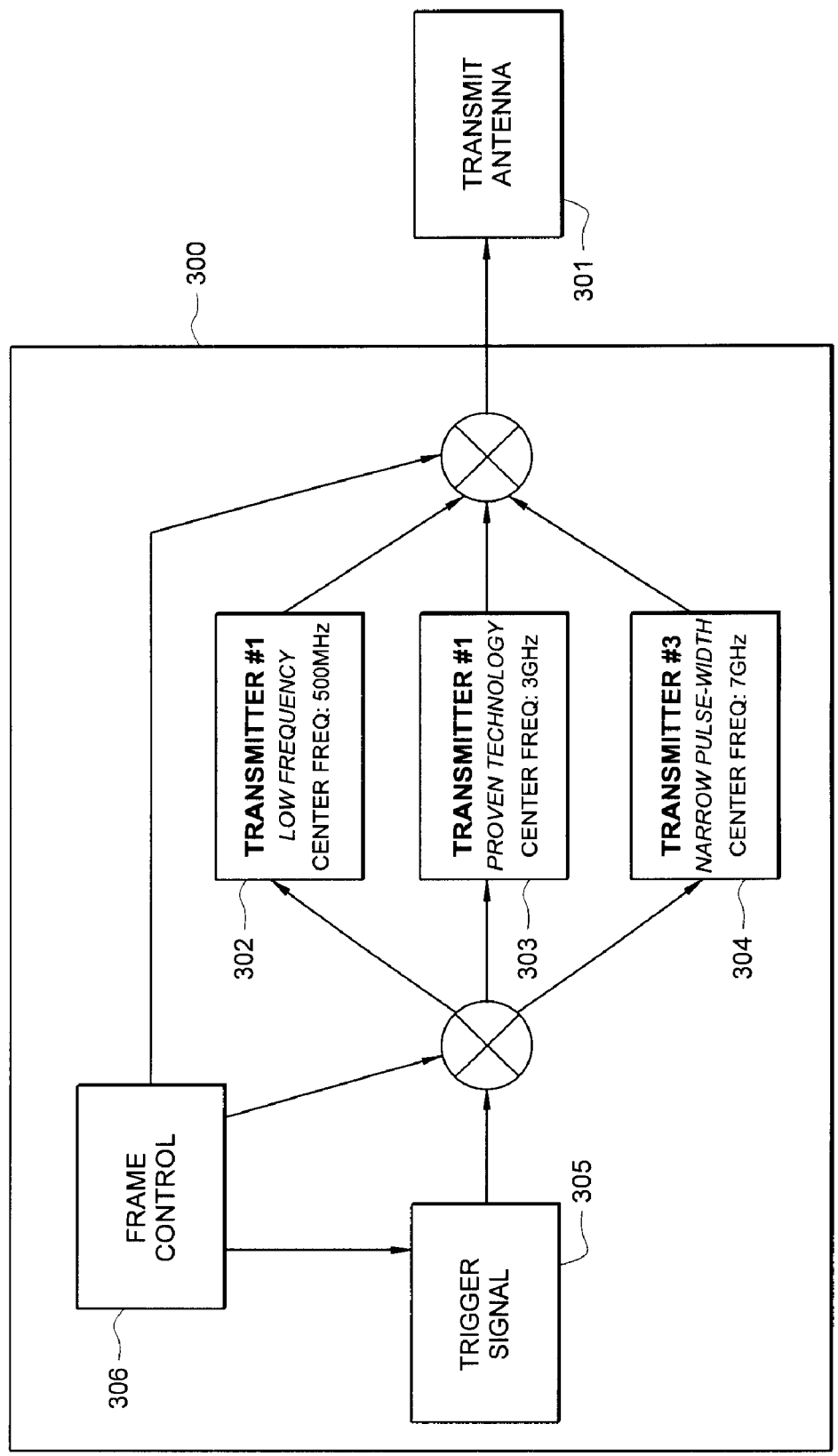
FIG. 3 is a block diagram of an embodiment of a multiple-frequency ground penetrating radar unit according to the concepts described herein.

FIG. 3 is an illustration of an embodiment of a multiple-frequency ground penetrating radar unit 300 according to the concepts described herein. Unit 300 uses separate, optimized transmitters to provide multiple frequencies to antenna 301. In an embodiment of multiple-frequency ground penetrating radar unit 300, a first transmitter is optimized for low frequency operation, having for example a center frequency of 500 MHz. Second transmitter 303 has an intermediate frequency, such as for example 3 GHz, while third transmitter 304 produces high frequency pulses, such as for example 7 GHz. First, second and third transmitters 302, 303, and 304, respectively, are controlled by frame control 306 and trigger signal 305 which control which transmitter sends pulses to antenna 301 and when that transmitter is triggered to transmit.

While multiple-frequency ground penetrating radar unit 300 is shown having three transmitters optimized for individual frequencies, and number of transmitters greater than two could be used while remaining within the concepts described herein. Individual transmitters could be chosen to have a frequency that provides a penetration/resolution profile that would operate multiple-frequency ground penetrating radar unit 300 in a manner optimized to find particular targets of interest. The transmitter units could be operated discretely or could be operated in a interleaved or simultaneous fashion to provide the imaging profile desired by the operator.

FIG. 4 is an illustration of an embodiment of a variable-frequency ground penetrating radar unit 400 according to the concepts described herein. Unit 400 utilizes a programmable transmitter 402 capable of producing pulses from 500 MHz to 10 GHz to be transmitted by antenna 401. Control circuit 403 provides pulse width control to programmable transmitter 402 to select the particular frequency produced. Control circuit 403 also controls trigger signal 404 which is used to trigger programmable transmitter 402.

Clock and control lines 405 sent instruction to control circuit 403 to control the operation of variable-frequency ground penetrating radar unit 400. The pulse width control lines 406 may include variable voltage lines to satisfy the transmitters varying voltage needs when changing pulse widths. Programmable transmitter 402 may be implemented in any of several well know techniques. While the embodiment of programmable transmitter 402 has been described as having a particular range of frequencies, any range of frequencies may be employed according to the concepts described herein.

Examples of techniques to implement programmable transmitter 402 are shown with reference to FIGS. 5(a)-(d) and FIGS. 6(a) and (b). The embodiments shown with reference to those figures employ an avalanche transistor to provide the pulses transmitted to antenna 401.

An avalanche transistors are bipolar junction transistor designed for operation in the region of its collector-current/collector-to-emitter voltage characteristics beyond the collector to emitter breakdown voltage, called avalanche breakdown region. This region is characterized by avalanche breakdown and negative differential resistance. Operation in the avalanche breakdown region is called avalanche mode operation: it gives avalanche transistors the ability to switch very high currents with less than a nanosecond rise and fall times (transition times). Avalanche transistors can be used as fast pulse generators, having rise and fall times of less than a nanosecond and high output voltages and current.

Avalanche mode switching relies on avalanche multiplication of current flowing through the collector-base junction as a result of impact ionization of the atoms in the semiconductor crystal lattice. Avalanche breakdown in semiconductors and has found application in switching circuits for two basic reasons: it can provide very high switching speeds, since current builds-up in very small times, in the picosecond range, due to avalanche multiplication; and it can provide very high output currents, since large currents can be controlled by very small ones, again due to avalanche multiplication.

Referring now to FIGS. 5(a) through 5(d), circuit diagrams illustrating various embodiments of a programmable pulse generator are shown. FIGS. 5(a) through 5(d) all show an avalanche transistor Q1 connected to a voltage $V_{HV}$ through collector resistor Rc. A capacitor C and resistors Ra are connected across collector and emitter terminals of transistor Q1 as shown. FIGS. 5(a) and (c) show a differential antenna with antenna connection on either side of variable capacitor Cvar, while FIGS. 5(b) and (d) shown a non-differential single ended transmit antenna connected to only one side of variable capacitor Cvar. FIGS. 5(a) and (b) shown variable capacitor Cvar connected across resistors Ra, while FIGS. 5(c) and (d) shown variable capacitor connected directly across the collector and emitter of avalanche diode Q1.

The pulse width of the avalanche device Q1 can be varied by adding variable amounts of capacitance across the antenna terminals or across the avalanche device itself. Adding capacitance to the avalanche device has the effect of extending the effective avalanche voltage range and to increase the output energy level, as well as increasing the pulse width. The same technique can be employed to any type of avalanche device including transistors, field effect transistors (FETs) or diodes. Varying the capacitance across the device will also affect the optimum voltage at which the device will avalanche. Voltage $V_{HV}$, therefore, will need to be adjusted by the control circuitry 403, from FIG. 4, to compensate. A small resistance can be included with Cvar to damp any ringing that occurs due to mismatches in impedances caused by the extra capacitance.

Figure 6B:
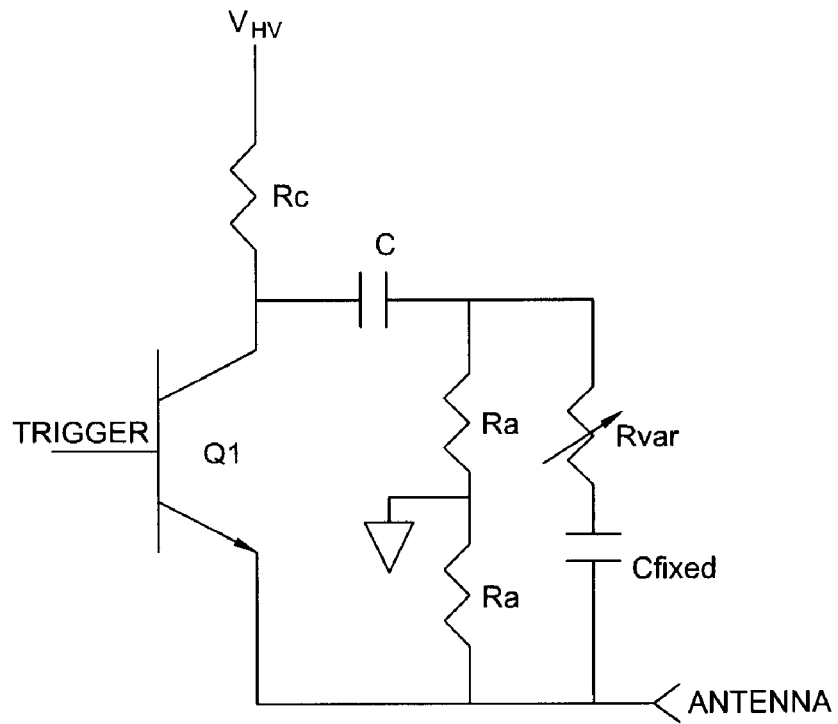
FIGS. 6(a) and (b) are circuit diagrams of additional embodiments of variable width pulse generators according to the concepts described herein.
Figure 6A:
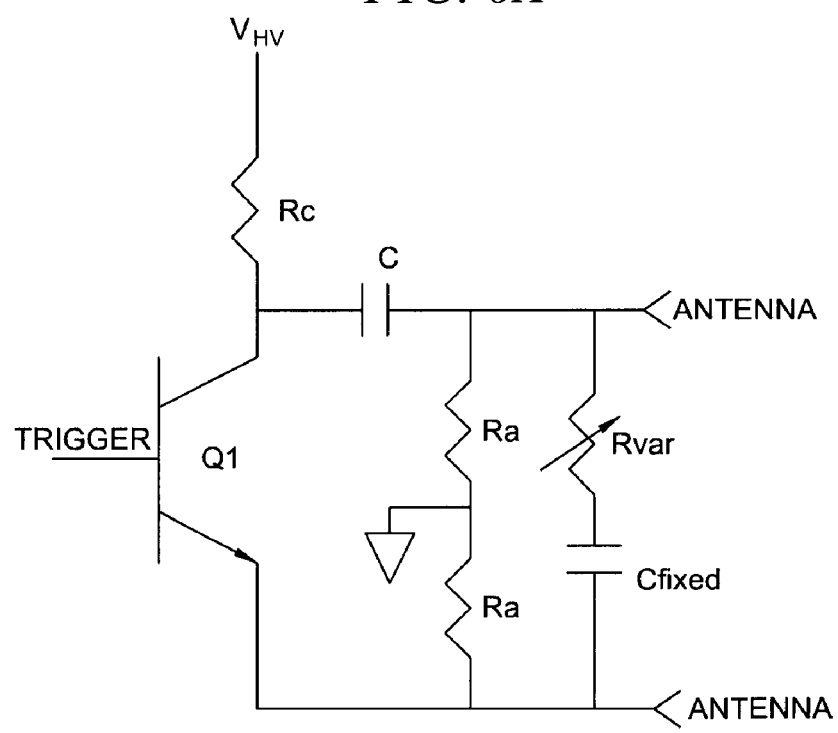

Referring now to FIGS. 6(a) and (b), circuit diagrams illustrating various embodiments of a programmable pulse generator are shown. The circuits of FIGS. 6(a) and (b) operate as described above with reference to FIGS. 5(a)-(d) except that a variable resistor Rvar is used with a fixed capacitor Cfixed to modulate the pulse width of avalanche transistor Q1.

Figure 7A:
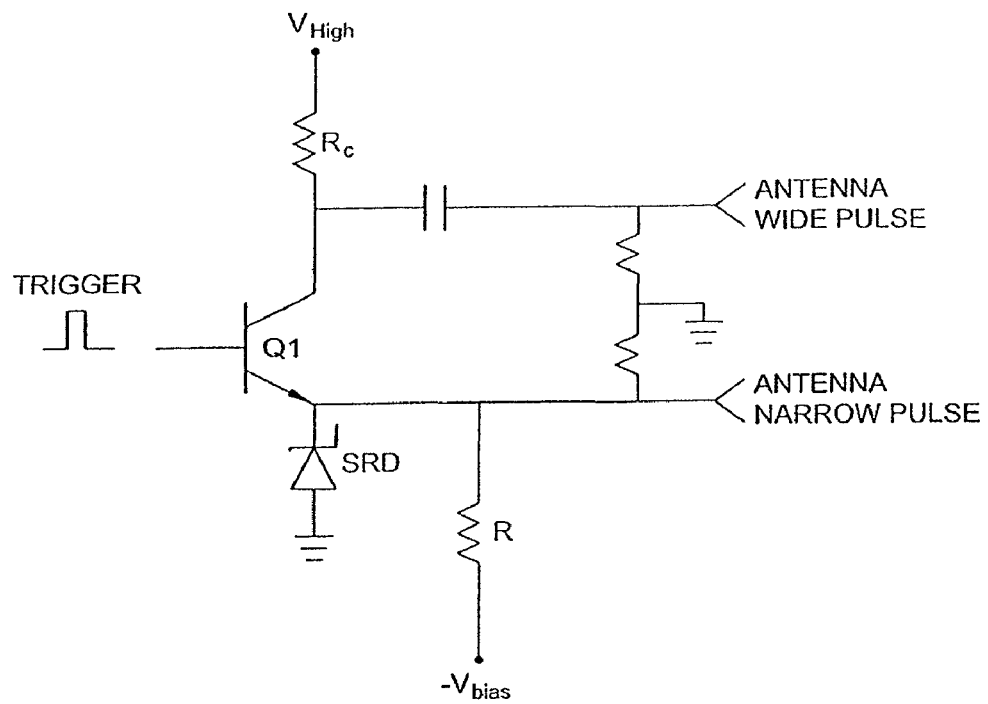
FIGS. 7(a) and (b) are circuit diagrams of additional embodiments of variable width pulse generators according to the concepts described herein.

Referring now to FIGS. 7(a) and (b), circuit diagrams illustrating various embodiments of a programmable pulse generator are shown. As with the circuits of FIG. 6, the circuits of FIG. 7 operate generally as described with the circuits of FIG. 5. However, the circuit of FIG. 7(a) and (b) include a step recovery diode connected to the emitter of avalanche transistors Q1. FIG. 7(a) shows an embodiment of a circuit that is able to product both wide and narrow pulses at the same time. Step recovery diode SRD is connected between the collector of avalanche transistor Q1 and ground. Using this method, the avalanche transistor Q1 in combination with the step recovery diode SRD can product both wide pulses (low frequency) and narrow pulses (high frequency) using the same trigger signal and antenna.

Figure 7B:
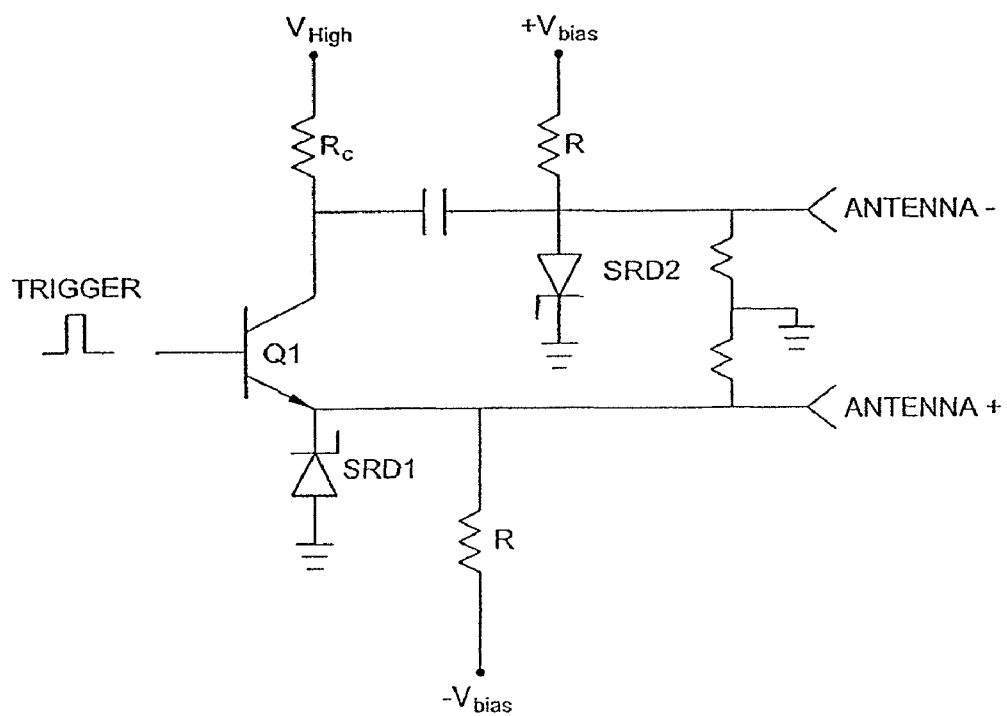

The circuit shown in FIG. 7(b) illustrates an embodiment of a circuit that has a variable or programmable pulse width based on the voltage $V_{bias}$. Voltage $V_{bias}$ and step recovery diode SRD2 is connected across the antenna terminal Ant-. By varying the voltage $V_{bias}$ the pulse width of the signal sent to antenna connection Ant-can be varied, resulting in a pulse width that is controllable with voltage $V_{bias}$.

Referring again to FIGS. 3 and 4, embodiments of GPR units 300 and 400 may be operated in a variety of different ways to optimize the performance of the GPR unit for particular applications. Additionally while single transmitters are shown for particular frequencies in FIG. 3 and a single programmable transmitter is shown in FIG. 4, multiple transmitter circuits may be used to provide greater control over the operation of the GPR unit and to allow the GPR unit to alternate between transmitter configurations on a frame by frame basis.

For example, with reference to a programmable transmitter unit as is described with reference to FIG. 4, multiple programmable transmitter may be used in conjunction with one another to allow varying length pulse widths to be alternately transmitted in sequential frames allowing the GPR unit to simultaneously provide high resolution images of shallow objects and lower resolution images of deeper objects. In a two transmitter GPR unit, the unit may alternate between the two transmitter configurations with every other frame, so that every other frame that the unit receives from the radar is a high resolution, high frequency frame and every other frame is a low frequency deep penetrating frame.

Additionally, each frame is made up of several thousand or more independently transmitted and sampled pulses, and each transmitted and sampled pulse is used to build a particular point in the time range. Using this characteristic of each frame, embodiments of a ground penetrating radar system could change the pulse width within a particular range gate to allow imaging of varying depth within a single frame. As an example, the first half (earlier half) of the time gate may use the narrow pulse width and the latter half of the time gate (corresponding to reflections from deeper targets) may use the wider pulse width. Alternatively, with a continuously variable pulse width, an example of which is shown in FIG. 7(b), the pulse width may be swept continuously over the entire time gate. Using these methods, a radar image that has both shallow and deep imaging can be created for display to an operator.

While embodiments described with reference to FIGS. 5 and 6 have employed avalanche transistors to generate the pulses, other technologies can be employed to generate the pulses within the scope of the concepts described herein. For example, step recovery diodes (SRDs) are another common way to generate a very fast pulse. two SRDs, one on its positive end and another on its negative end can be used to generate a fast pulse. One SRD can be placed on the antenna connection in a dual differential antenna system, and another SRD on the opposing antenna connection. A bias current is directed through SRDs and modulated to try to vary the pulse width.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A ground penetrating radar system comprising:
   an antenna;
   a variable width pulse generator connected to the antenna; and
   control circuitry connected to the variable width pulse generator;

wherein the variable width pulse generator and antenna combination is operable to generate a plurality of pulses of electromagnetic radiation energy;

wherein a first frequency-domain transform of a first pulse of the plurality of pulses exhibits a continuous range of first frequency value contributions with an associated range of first amplitude values over at least an approximately 500 MHz wide frequency band;

wherein the associated range of first amplitude values includes at least a first maximum amplitude at approximately a first center electromagnetic radiation frequency value;

wherein a second frequency-domain transform of a second pulse of the plurality of pulses exhibits a continuous range of second frequency value contributions with an associated range of second amplitude values over at least an approximately 500 MHz wide frequency band;

wherein the associated range of second amplitude values includes at least a second maximum amplitude at approximately a second center electromagnetic radiation frequency value;

wherein the first center electromagnetic radiation frequency value is different from the second center electromagnetic radiation frequency value; and wherein the control circuitry is operable to vary at least one of: the first center electromagnetic radiation frequency value and the second center electromagnetic radiation frequency value.

2. The system of claim 1
wherein the control circuitry is operable to generate a trigger signal; and
wherein the variable width pulse generator is operable to activate in response to the trigger signal.

3. The system of claim 1
wherein the variable width pulse generator comprises an avalanche transistor.

4. The system of claim 3
wherein the variable width pulse width generator and control circuitry further includes comprise a variable capacitor;
wherein at least one of the first center electromagnetic radiation frequency value and the second center electromagnetic radiation frequency value is subject to variation, in part, through variation of a capacitance value of the variable capacitor.

5. The system of claim 3
wherein the variable width pulse generator and control circuitry comprise a variable resistor and a fixed capacitor;
wherein at least one of the first center electromagnetic radiation frequency value and the second center electromagnetic radiation frequency value is subject to variation, in part, through variation of a resistance value of the variable resistor.

6. The system of claim 1 wherein the antenna is a dual differential antenna.

7. The system of claim 1 wherein the antenna is a non-differential single-ended antenna.

8. The system of claim 1 comprising:
a second pulse width generator connected to the control circuitry and the antenna;
wherein the second pulse width generator and antenna combination is operable to generate a second plurality of pulses of electromagnetic radiation energy;
wherein a frequency-domain transform of at least one pulse of the second plurality of pulses exhibits a continuous range of frequency value contributions with an associated range of amplitude values over at least an approximately 500 MHz wide frequency band; and wherein the associated range of amplitude values includes at least a maximum amplitude at approximately a center electromagnetic radiation frequency value.

9. The system of claim 8
wherein the center electromagnetic radiation frequency value is different from the first center electromagnetic radiation frequency value;
wherein, to acquire a first frame of data comprising data associated at least with the first pulse, the variable width pulse generator and antenna combination is operable to generate the first pulse;
wherein, to acquire a second frame of data comprising data associated with the at least one pulse of the second plurality of pulses, the second pulse width generator and antenna combination is operable to generate the at least one pulse of the second plurality of pulses; and
wherein the second frame of data is at least sequential and adjacent to the first frame of data so as to be at least one of a set of frames of data alternating with the first frame of data.

10. A ground penetrating radar system comprising:
an antenna;
a first pulse generator directly connected to the antenna;
a second pulse generator directly connected to the antenna; and
control circuitry connected to the first generator and connected to the second pulse generator;
wherein the first pulse generator and antenna combination is operable to generate at least a first of pulse of electromagnetic radiation energy;
wherein a first frequency-domain transform of the first pulse exhibits a continuous range of first frequency value contributions with an associated range of first amplitude values over at least an approximately 500 MHz wide frequency band;
wherein the associated range of first amplitude values includes at least a first maximum amplitude at approximately a first center electromagnetic radiation frequency value;
wherein the second pulse generator and antenna combination is operable to generate at least a second pulse of electromagnetic radiation energy;
wherein a second frequency-domain transform of the second pulse exhibits a continuous range of second frequency value contributions with an associated range of second amplitude values over at least an approximately 500 MHz wide frequency band;
wherein the associated range of second amplitude values includes at least a second maximum amplitude at approximately a second center electromagnetic radiation frequency value;
wherein the first center electromagnetic radiation frequency value is different from the second center electromagnetic radiation frequency value; and
wherein, to acquire a first frame of data comprising data associated with at least the first pulse, the control cicuitry is operable to activate the first pulse generator and antenna combination to generate the first pulse.

11. The system of claim 10
wherein, to acquire a second frame of data comprising data associated with at least the second pulse, the control circuitry is operable to activate the second pulse generator and antenna combination to generate the second pulse; and wherein the second frame of data is at least sequential and adjacent to the first frame of data so as to be at least one of a set of frames of data alternating with the first frame of data.

12. The system of claim 11
wherein the control circuitry is operable to generate a first trigger signal and a second trigger signal;
wherein the first pulse generator is operable to activate in response to the first trigger signal so as to generate, in combination with the antenna, the first pulse; and
wherein the second pulse generator is operable to activate in response to the second trigger signal so as to generate, in combination with the antenna, the second pulse.

13. The system of claim 10 wherein the antenna is a dual differential antenna.

14. The system of claim 10 wherein the antenna is a non-differential single-ended antenna.

15. The system of claim 10
wherein the control circuitry is operable to generate a first trigger signal and a second trigger signal;
wherein the first pulse generator is operable to activate in response to the first trigger signal so as to generate, in combination with the antenna, the first pulse; and
wherein the second pulse generator is operable to activate in response to the second trigger signal.

16. A ground penetrating radar system comprising:
an antenna;
a variable width pulse generator connected to the antenna, the variable width pulse generator comprising an avalanche transistor connected to a step recovery diode; and
control circuitry connected to the variable width pulse generator;
wherein the variable width pulse generator and antenna combination is operable to generate at least a first pulse of electromagnetic radiation energy in response to a trigger signal, and is also operable to generate at least a second pulse of electromagnetic radiation energy in response to the trigger signal;
wherein a first frequency-domain transform of the first pulse exhibits a continuous range of first frequency value contributions with an associated range of first amplitude values over at least an approximately 500 MHz wide frequency band;
wherein the associated range of first amplitude values includes at least a first maximum amplitude at approximately a first center electromagnetic radiation frequency value;
wherein a second frequency-domain transform of the second pulse exhibits a continuous range of second frequency value contributions with an associated range of second amplitude values over at least an approximately 500 MHz wide frequency band;
wherein the associated range of second amplitude values includes at least a second maximum amplitude at approximately a second center electromagnetic radiation frequency value;
wherein the first center electromagnetic radiation frequency value is different from the second center electromagnetic radiation frequency value; and
wherein the control circuitry is operable to vary at least one of: the first center electromagnetic radiation frequency value and the second center electromagnetic radiation frequency value.

17. The system of claim 16 wherein the antenna comprises a differential antenna and the variable width pulse generator comprises a second step recovery diode connected to a terminal of the differential antenna.

18. The system of claim 16 wherein at least one of the first center electromagnetic radiation frequency value and the second center electromagnetic radiation frequency value is subject to variation, in part, through variation of a value of a first bias voltage across the step recovery diode.

19. The system of claim 16 comprising:
a second variable width pulse generator connected to the antenna and operable to be controlled by the control circuitry.

20. A method for creating a ground penetrating radar image, the method comprising:
generating a first radar pulse of electromagnetic energy using a variable width pulse generator and control circuitry;
generating a second radar pulse of electromagnetic energy using the variable width generator and control circuitry;
receiving a first return signal associated with the first radar pulse of electromagnetic energy;
receiving a second return signal associated with the second radar pulse of electromagnetic energy;
generating a plurality of frames of data, the plurality of frames of data including data associated with the first radar pulse, the second radar pulse, the first return signal, and the second return signal; and
displaying on a display device a radar image generated from data comprising at least one frame of the plurality of frames of data;
wherein a first frequency-domain transform of the first radar pulse exhibits a continuous range of first frequency value contributions with an associated range of first amplitude values over at least an approximately 500 MHz wide frequency band;
wherein the associated range of first amplitude values includes at least a first maximum amplitude at approximately a first center electromagnetic radiation frequency value;
wherein a second frequency-domain transform of the second radar pulse exhibits a continuous range of second frequency value contributions with an associated range of second amplitude values over at least an approximately 500 MHz wide frequency band;
wherein the associated range of second amplitude values includes at least a second maximum amplitude at approximately a second center electromagnetic radiation frequency value;
wherein the first center electromagnetic radiation frequency value is different from the second center electromagnetic radiation frequency value; and
wherein the control circuitry is operable to vary at least one of: the first center electromagnetic radiation frequency value and the second center electromagnetic radiation frequency value.

21. The method of claim 20
wherein a first portion of the at least one frame of the plurality of frames of data is comprised of data associated with the first radar pulse of electromagnetic energy and data associated with the first return signal, and a second portion of the at least one frame of the plurality of frames of data is comprised of data associated with the second radar pulse of electromagnetic energy and data associated with the second return signal.

22. The method of claim 20 comprising:
generating a third radar pulse of electromagnetic energy using the variable width generator and control circuitry;
wherein the at least one frame of data includes data associated with the third radar pulse;

wherein a third frequency-domain transform of the third radar pulse exhibits a continuous range of third frequency value contributions with an associated range of third amplitude values over at least an approximately 500 MHz wide frequency band;

wherein the associated range of third amplitude values includes at least a third maximum amplitude at approximately a third center electromagnetic radiation frequency value;

wherein the first radar pulse is generated during a first time period, the second radar pulse is generated during a second time period such that the second time period is in a sequentially adjacent relationship to the first time period, and the third radar pulse is generated during a third time period such that the third time period is in a sequentially adjacent relationship to the second time period, the first time period starting at a first time, the second time period starting at a second time, and the third time period starting at a third time; and wherein at least one curve in a graph of frequency values as a function of time connecting a first point determined by the first center electromagnetic radiation frequency value and the first time, a second point determined by the second center electromagnetic radiation frequency value and the second time, and a third point determined by the third center electromagnetic radiation frequency value and the third time, substantially describes a continuous variation of frequency values as a function of time within the at least one frame.

23. The method of claim 20 wherein the variable width pulse width generator comprises an avalanche transistor.

24. The method of claim 23 wherein the variable width pulse generator comprises a step recovery diode connected to the avalanche transistor.

25. A ground penetrating radar system comprising:
an antenna;
a variable width pulse generator connected to the antenna; and
control circuitry connected to the variable width pulse generator;
wherein the variable width pulse generator and antenna combination is operable to generate a plurality of pulses of electromagnetic radiation energy;
wherein the control circuitry is operable to set a first center electromagnetic radiation frequency value associated with a first pulse of the plurality of pulses of electromagnetic radiation energy, and is operable to set a second center electromagnetic radiation frequency value associated with a second pulse of the plurality of pulses of electromagnetic radiation energy;
wherein the first center electromagnetic radiation frequency value is different from the second center electromagnetic radiation frequency value;
wherein the variable width pulse generator comprises at least two step recovery diodes connected across the antenna terminals; and
wherein the first center electromagnetic radiation frequency value is subject to variation, at least in part, through variation of a value of a first bias current in at least one step recovery diode of the at least two step recovery diodes.

26. The system of claim 25
wherein the control circuitry is operable to generate a trigger signal; and
wherein the variable width pulse generator is operable to activate in response to the trigger signal.

27. The system of claim 25 wherein the antenna is a dual differential antenna.

28. The system of claim 25 comprising:
a second pulse width generator connected to the control circuitry and the antenna;
wherein the second pulse width generator and antenna combination is operable to generate a second plurality of pulses of electromagnetic radiation energy;
wherein a frequency-domain transform of at least one pulse of the second plurality of pulses exhibits a continuous range of frequency value contributions with an associated range of amplitude values over at least an approximately 500 MHz wide frequency band; and
wherein the associated range of amplitude values includes at least a maximum amplitude at approximately a center electromagnetic radiation frequency value.

29. The system of claim 28
wherein the center electromagnetic radiation frequency value is different from the first center electromagnetic radiation frequency value;
wherein a first frame of data comprises data associated with the first pulse of the plurality of pulses of electromagnetic radiation energy;
wherein a second frame of data comprises data associated with the at least one pulse of the second plurality of pulses of electromagnetic radiation energy; and
wherein the second frame is sequential and adjacent to the first frame so as to be at least one of a set of frames alternating with the first frame.

* * * * *